US012073609B2

(12) United States Patent
Hovden et al.

(10) Patent No.: US 12,073,609 B2
(45) Date of Patent: Aug. 27, 2024

(54) AUTOMATED CLASSIFICATION BASED ON PHOTO-REALISTIC IMAGE/MODEL MAPPINGS

(71) Applicant: Matterport, Inc., Sunnyvale, CA (US)

(72) Inventors: Gunnar Hovden, Los Gatos, CA (US);
Mykhaylo Kurinnyy, Milpitas, CA (US)

(73) Assignee: Matterport, Inc., Sunnyvale, CA (US)

( * ) Notice: Subject to any disclaimer, the term of this patent is extended or adjusted under 35 U.S.C. 154(b) by 0 days.

(21) Appl. No.: 18/302,780

(22) Filed: Apr. 18, 2023

(65) Prior Publication Data
US 2023/0260265 A1    Aug. 17, 2023

Related U.S. Application Data

(63) Continuation of application No. 17/235,815, filed on Apr. 20, 2021, now Pat. No. 11,670,076, and a
(Continued)

(51) Int. Cl.
*G06V 10/778*      (2022.01)
*G06F 18/21*       (2023.01)
(Continued)

(52) U.S. Cl.
CPC ...... *G06V 10/7796* (2022.01); *G06F 18/2193* (2023.01); *G06T 15/04* (2013.01);
(Continued)

(58) Field of Classification Search
CPC .... G06V 10/7796; G06V 20/10; G06V 20/35; G06V 20/647; G06F 18/2193;
(Continued)

(56) References Cited

U.S. PATENT DOCUMENTS 7,876,934 B2    1/2011  Georgescu et al.
8,175,412 B2    5/2012  Basri et al.
(Continued)

OTHER PUBLICATIONS

"Automatic registration of LIDAR and optical images of urban scenes", Mastin A., 2009 IEEE conference on computer vision and pattern recognition (Year: 2009).
(Continued)

*Primary Examiner* — Michael S Osinski
(74) *Attorney, Agent, or Firm* — Ahmann Kloke LLP

(57) ABSTRACT

Techniques are provided for increasing the accuracy of automated classifications produced by a machine learning engine. Specifically, the classification produced by a machine learning engine for one photo-realistic image is adjusted based on the classifications produced by the machine learning engine for other photo-realistic images that correspond to the same portion of a 3D model that has been generated based on the photo-realistic images. Techniques are also provided for using the classifications of the photo-realistic images that were used to create a 3D model to automatically classify portions of the 3D model. The classifications assigned to the various portions of the 3D model in this manner may also be used as a factor for automatically segmenting the 3D model.

24 Claims, 7 Drawing Sheets
(5 of 7 Drawing Sheet(s) Filed in Color)

Related U.S. Application Data continuation of application No. 16/742,845, filed on Jan. 14, 2020, now Pat. No. 10,984,244, and a continuation of application No. 15/626,104, filed on Jun. 17, 2017, now Pat. No. 10,534,962.

(51) Int. Cl.

| | | |
|---|---|---|
| *G06T 15/04* | (2011.01) | |
| *G06T 15/20* | (2011.01) | |
| *G06T 17/00* | (2006.01) | |
| *G06T 19/00* | (2011.01) | |
| *G06V 20/00* | (2022.01) | |
| *G06V 20/10* | (2022.01) | |
| *G06V 20/64* | (2022.01) | |

(52) U.S. Cl.
CPC ............ *G06T 15/205* (2013.01); *G06T 17/00* (2013.01); *G06T 19/003* (2013.01); *G06V 20/10* (2022.01); *G06V 20/35* (2022.01); *G06T 2210/04* (2013.01); *G06V 20/647* (2022.01)

(58) Field of Classification Search
CPC ....... G06T 15/04; G06T 15/205; G06T 17/00; G06T 19/003; G06T 2210/04; G06T 17/05; G06T 15/20; G06T 7/75; G06T 19/006; G06T 19/20; G06T 2207/10028; G06T 7/55; G06T 11/60; G06T 19/00; G06T 2200/24; G06T 2207/20081; G06T 11/00; G06T 2200/04; A61B 2034/105; A61B 2034/2051; A61B 34/10; A61B 34/20; A61B 5/055
See application file for complete search history.

(56) References Cited

U.S. PATENT DOCUMENTS

| | | | |
|---|---|---|---|
| 8,798,965 | B2 | 8/2014 | Quan et al. |
| 8,902,288 | B1 | 12/2014 | Fan et al. |
| 9,324,190 | B2 | 4/2016 | Bell et al. |
| 9,760,994 | B1 | 9/2017 | Bell et al. |
| 10,139,985 | B2 | 11/2018 | Mildrew et al. |
| 10,163,261 | B2* | 12/2018 | Bell ..................... G06T 19/003 |
| 10,328,281 | B2* | 6/2019 | Stopek ................. A61N 5/1039 |
| 10,460,511 | B2* | 10/2019 | Ondruska .............. G06T 7/579 |
| 2005/0094879 | A1 | 5/2005 | Harville |
| 2006/0239539 | A1 | 10/2006 | Kochi et al. |
| 2008/0112610 | A1 | 5/2008 | Israelsen et al. |
| 2008/0247635 | A1 | 10/2008 | Davis et al. |
| 2009/0208094 | A1 | 8/2009 | Hattori et al. |
| 2010/0214284 | A1 | 8/2010 | Rieffel et al. |
| 2011/0187746 | A1 | 8/2011 | Suto et al. |
| 2011/0286660 | A1 | 11/2011 | Ofek et al. |
| 2012/0020548 | A1 | 1/2012 | Kao et al. |
| 2012/0082341 | A1 | 4/2012 | Takeuchi et al. |
| 2013/0009950 | A1 | 1/2013 | Ben-David et al. |
| 2013/0207966 | A1 | 8/2013 | Chu et al. |
| 2015/0003723 | A1 | 1/2015 | Huang et al. |
| 2015/0161818 | A1 | 6/2015 | Komenczi et al. |
| 2015/0310667 | A1 | 10/2015 | Young et al. |
| 2015/0371431 | A1 | 12/2015 | Korb et al. |
| 2016/0127690 | A1 | 5/2016 | Kaehler et al. |
| 2017/0039718 | A1 | 2/2017 | Kotake et al. |
| 2017/0084077 | A1 | 3/2017 | Liu et al. |
| 2017/0193693 | A1 | 7/2017 | Robert et al. |
| 2017/0228926 | A1 | 8/2017 | Golovinskiy et al. |
| 2018/0075652 | A1 | 3/2018 | Kim |
| 2018/0096486 | A1* | 4/2018 | Nishiyama ................ G06T 7/55 |
| 2018/0144547 | A1 | 5/2018 | Shakib et al. |
| 2018/0168730 | A1* | 6/2018 | Nazy ...................... G16H 30/40 |
| 2018/0261005 | A1 | 9/2018 | Lin et al. |
| 2018/0300876 | A1* | 10/2018 | Mauldin, Jr. ........ A61B 8/0875 |
| 2018/0357762 | A1* | 12/2018 | Kobayashi ............ A61B 6/025 |
| 2019/0147619 | A1 | 5/2019 | Goldman et al. |
| 2019/0155302 | A1 | 5/2019 | Lukierski et al. |
| 2019/0188371 | A1* | 6/2019 | Shen ...................... G06F 21/36 |
| 2019/0357987 | A1* | 11/2019 | Harks .................... A61B 34/20 |
| 2020/0082595 | A1* | 3/2020 | Okada ................. G06T 15/506 |
| 2021/0287331 | A1* | 9/2021 | Kwon .................... G06T 11/00 |
| 2022/0110696 | A1* | 4/2022 | Helm ................... A61B 6/4441 |

OTHER PUBLICATIONS

"Discrete-continuous depth estimation from a single image", Liu M., Proceedings of the IEEE Conference on Computer Vision and Pattern Recognition (Year: 2014).

"Indoor segmentation and support inference from rgbd images", Silberman N., European Conference on Computer Vision (Year: 2012).

"Physically-based rendering for indoor scene understanding using convolutional neural networks", Zhang Y., Proceedings of the IEEE Conference on Computer Vision and Pattern Recognition (Year: 2017).

Boykov et al., "Fast Approximate Energy Minimization via Graph Cuts", dated 2001, 8 pages.

He et al., "Mask R-CNN", Facebook AI Research (FAIR), dated Apr. 5, 2017, 10 pages.

Kourinny, Mikhail, "Meet Matterport's Newest Employee: Thomas Bayes", https://engineering.matterport.com/meet-matterports-newest-employee, dated Jan. 24, 2018, 9 pages.

Notice of Allowance for U.S. Appl. No. 17/235,815 dated Jan. 19, 2023, 13 pages.

Shi et al., "Normalized Cuts and Image Segmentation", IEEE Transactions on Pattern Analysis and Machine Intelligence, vol. 22, No. 8, Aug. 2000, 18 pages.

* cited by examiner

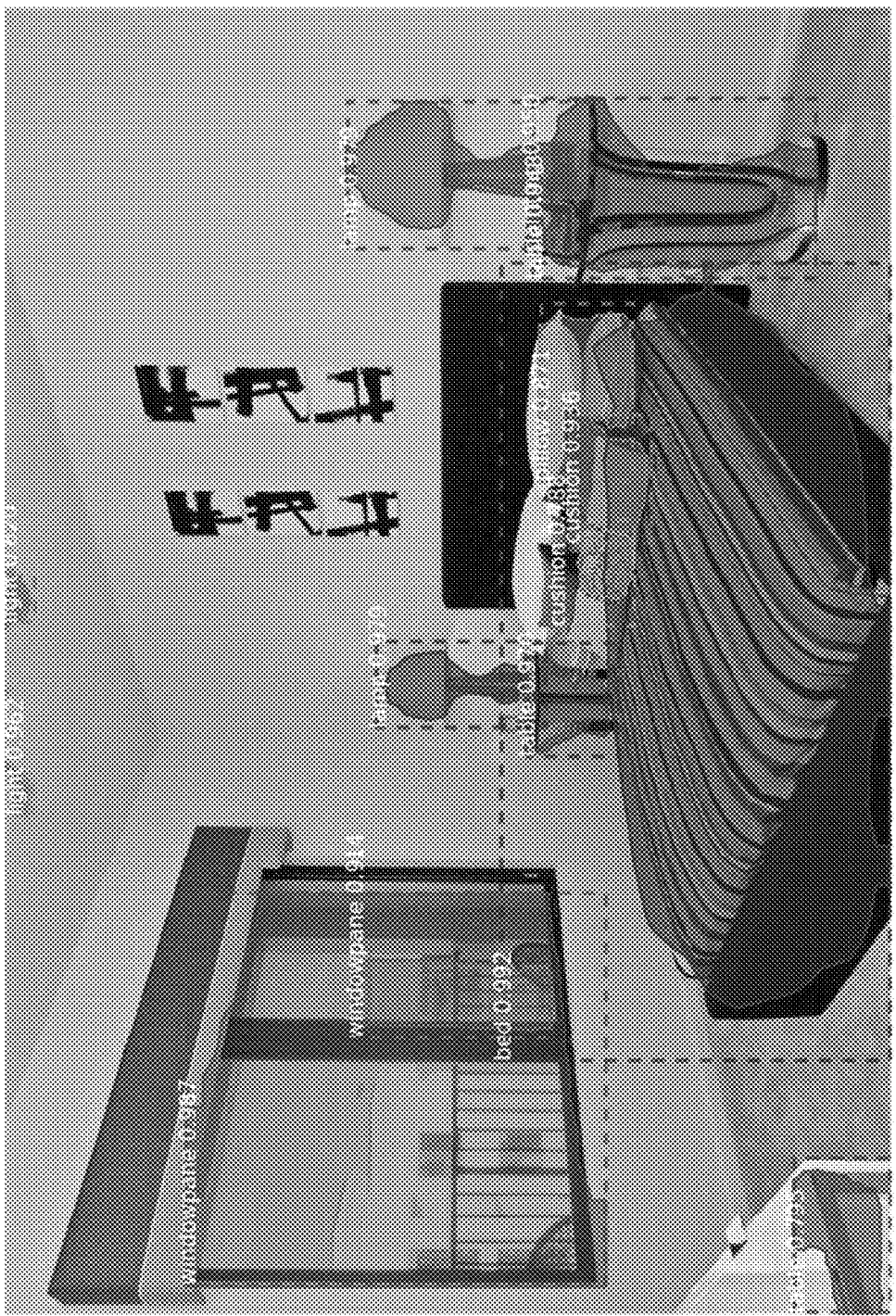
FIG. 7 - Prior Art

AUTOMATED CLASSIFICATION BASED ON PHOTO-REALISTIC IMAGE/MODEL MAPPINGS

CROSS REFERENCE TO RELATED APPLICATIONS

This application is a continuation of U.S. patent application Ser. No. 17/235,815, filed Apr. 20, 2021 and entitled "Automated Classification Based on Photo-Realistic Image/Model Mappings," which is a continuation of U.S. patent application Ser. No. 16/742,845, filed on Jan. 14, 2020 and entitled "Automated Classification Based on Photo-Realistic Image/Model Mappings," now issued as U.S. Pat. No. 10,984,244, which is a continuation of U.S. patent application Ser. No. 15/626,104, filed on Jun. 17, 2017 and entitled "Automated Classification Based on Photo-Realistic Image/Model Mappings," now issued as U.S. Pat. No. 10,534,962, all of which are incorporated herein by reference in their entirety.

FIELD OF THE INVENTION

The present invention relates to automated classification and, more specifically, to automated classification based on mappings between photo-realistic images and 3D models constructed based on the photo-realistic images.

BACKGROUND

To classify a digital photo-realistic image, a human can view the photo-realistic image and then manually tag the photo-realistic image with descriptive metadata. The types of information provided in such tags is virtually limitless. Common tags may indicate the names of people in the photo-realistic image, the objects in the photo-realistic image, and the location and/or event at which the photo-realistic image was captured. Manual tagging produces highly accurate tags, because human brains are highly skilled at interpreting the content of photo-realistic images. However, manually tagging photo-realistic images can consume an inordinate amount of time, particularly when the collection of photo-realistic images to be tagged is large.

To avoid the human effort required by manual tagging, techniques have been developed to automatically tag photo-realistic images with certain types of information. For example, digital cameras can automatically store some types of information with each photo-realistic image, such as time, date and GPS coordinates at the time at which the photo-realistic image is captured. However, automatically tagging photo-realistic images with some types of information is not so straightforward.

Various techniques have been developed to automatically identify complex features, such as human faces and objects, within photo-realistic images. Such techniques include, for example, using photo-realistic images that depict a particular type of object to train a machine learning engine to recognize that type object in other photo-realistic images. Once trained, the machine learning engine may predict the likelihood that any given photo-realistic image contains the type of object in question. Once analyzed, those photo-realistic images that are predicted to contain a type of object may be tagged with metadata that indicates the object they depict. For example, a machine learning engine may predict that the photo-realistic image of the front of a house depicts a door, and that photo-realistic image (or a set of pixels within the photo-realistic image) may be tagged with the metadata indicating that a door is depicted in the photo-realistic image.

Unfortunately, classifications made by machine learning engines can be indefinite and imprecise. To reflect the indefinite nature of such classifications, the classification automatically assigned to an object in an image may be a list of labels with corresponding "confidence scores". For example, a trained machine learning engine may classify a particular object in a particular image as: 45% bottle, 25% vase, 25% wine glass, 5% test tube. Thus, there is a need to improve the accuracy of automated classifications of photo-realistic images.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The patent or application file contains at least one drawing executed in color. Copies of this patent or patent application publication with color drawings will be provided by the Office upon request and payment of the necessary fee.

In the drawings:

FIG. 7 is an example of a photo that has undergone per instance, per-pixel segmentation.

DETAILED DESCRIPTION

Figure 1:
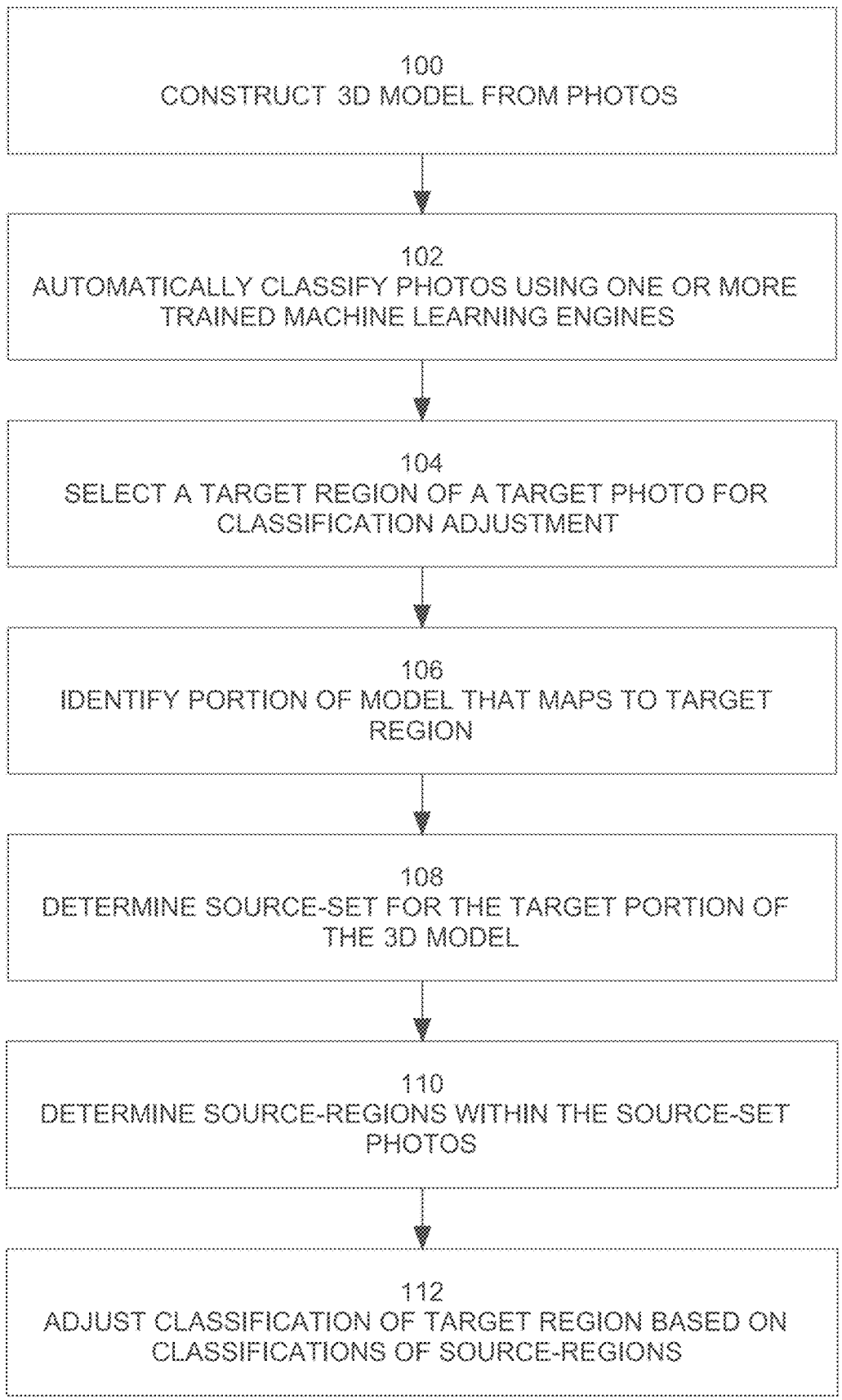
FIG. 1 is a flowchart illustrating steps for adjusting the classification of a target region of a photo-realistic image, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for increasing the accuracy of automated classifications produced by a machine learning engine. Specifically, the classification produced by a machine learning engine for one photo-realistic image is adjusted based on the classifications produced by the machine learning engine for other photo-realistic images that correspond to the same portion of a 3D model that has been generated based on the photo-realistic images. For example, a 3D model of a house may be created based on photo-realistic images taken at various locations within the house, in conjunction with associated depth/distance metadata. The 3D model of the house may include multiple rooms. For a given room in the model, the photo-realistic images that correspond to the room may have been assigned inconsistent classifications. For example, assume that a room of the model corresponds to five photo-realistic images, where one of the photo-realistic images was automatically classified as "dining room", one of the photo-realistic images was automatically classified as "bedroom", and three of the photo-realistic images were classified as "kitchen". In this example, based on the fact that all five photo-realistic images map to the same room in the model, the classification of the two photo-realistic images that were not classified as "kitchen" may be changed to "kitchen".

Further, the classifications of the photo-realistic images used to create a 3D model may be used to automatically classify portions of the 3D model. For example, if the majority of the photo-realistic images that correspond to a particular room in the model have been automatically classified as "kitchen", then the room itself, within the 3D model, may be tagged with the classification of "kitchen". This image-to-model projection of classifications can be done at any level of granularity. For example, rather than classify an entire room of a model, the technique may be used to classify a mesh surface in the room (e.g. a face in the mesh of the 3D model) or an object in the room. As a more specific example, all photo-realistic images that map to a particular object in the 3D model may have been classified as having a "vase" in the portion of the photo-realistic images that maps onto that particular object. Consequently, within the 3D model, that object may be automatically classified as a vase.

Automated Classification of Photo-Realistic Images

As mentioned above, various techniques have been developed for automatically classifying photo-realistic images. One such technique involves the use of Artificial Neural Networks. One implementation of this technique, which assigns classifications to entire images, is described at www.nvidia.cn/content/tesla/pdf/machine-learning/imagenet-classification-with-deep-convolutional-nn.pdf.
Another implementation of an Artificial Neural Network, referred to as Mask R-CNN, detects objects in an image while simultaneously generating a high-quality per-instance per-pixel segmentation. FIG. 7 is an example of a photo that has undergone per instance, per-pixel segmentation. Mask R-CNN is described, for example, in the document located at arxiv.org/pdf/1703.06870.pdf, the contents of which are incorporated herein by reference. The specific technique used to make the initial classifications may vary from implementation to implementation, and the techniques described herein are not limited to any particular machine learning engine.

The granularity at which the classifications are made by machine learning engines may vary based on the nature of the classification. For example, an entire photo-realistic image may be tagged with "bedroom", while specific regions within the photo-realistic image are tagged with more specific labels, such as "bed", "chair" and "vase". The techniques described herein for improving the accuracy of such classifications may be used at any level of granularity. Thus, for the purpose of explanation, the techniques shall be described with respect to adjusting the classification of a "target region" of a "target photo-realistic image". However, that "target region" may be as large as the entire photo-realistic image, or as small as individual pixels or sub-pixels of the target photo-realistic image.

Generating 3D Models from Photo-Realistic Images

Before the classification of a photo-realistic image can be improved based on the mapping between the photo-realistic image and a 3D model, a 3D model must first be constructed based on the photo-realistic images and, optionally, associated depth/distance metadata. 3D models constructed in this manner may take a variety of forms, including but not limited to point clouds, meshes and voxels. Further, the 3D models can contain color data such as texture maps, point colors, voxel colors etc. The classification enhancement techniques described herein are not limited to any particular type of 3D model. Various techniques may be used to generate a 3D model based on a collection of photo-realistic images. Such techniques are described, for example, in:
  U.S. patent application Ser. No. 11/939,663 entitled "System and method for 3d model generation"
  U.S. patent application Ser. No. 13/776,688 entitled "Capturing and aligning three-dimensional scenes"
  U.S. patent application Ser. No. 13/148,173 entitled "Generating three-dimensional models from images"
Each of these documents is incorporated herein, in its entirety, by this reference.

Frequently, the photo-realistic images used to construct 3D models of real-world environments are panoramic and include various types of metadata used in the construction of the 3D models. The metadata used in the construction of the 3D models may be available at the time the photo-realistic images are captured. Alternatively, some or all of the metadata may be derived after capture using an alignment algorithm. As an example of the metadata that may accompany photo-realistic images, each photo-realistic image may have associated spatial information that indicates exactly where the photo-realistic image was captured, the focal direction for the photo-realistic image (or for each portion of the photo-realistic image when the photo-realistic image is panoramic), etc. In addition, the metadata may include distance information, for example indicating the distance of various pixels in the image from the spatial point from which the photo-realistic image was captured. More specifically, the depth information may include per-pixel depth information for some pixels of an image, and/or depth values at specific points relative to the image.

The techniques described herein for improving the classification of images and/or portions of 3D models are not limited to any particular technique for constructing those 3D models, as long as image-to-model mappings can be determined.

Segmenting 3D Models

After a 3D model has been generated based on a collection of captured photo-realistic images, it is often useful to segment the model and assign labels to the segments. For example, assume that a 3D model of a house is constructed from photo-realistic images captured within and around the house. Once created, it may be useful to segment the model into distinct rooms, specific surfaces (eg floors), and/or specific objects (eg tables). Techniques are described hereafter for improving the accuracy of automatic segmentation of a 3D model and the automatic labelling of segments of a 3D model by projecting the classifications of photo-realistic images used to construct the 3D model onto the corresponding portions of the 3D model.

Existing techniques for segmenting 3D models that have been constructed based on photo-realistic images of real-world environments are described, for example, in:

U.S. patent application Ser. No. 11/265,772 entitled "Method of database-guided segmentation of anatomical structures having complex appearances"

U.S. patent application Ser. No. 13/776,688 entitled "Capturing and aligning three-dimensional scenes"

U.S. patent application Ser. No. 14/743,748 entitled "Building a three-dimensional composite scene"

Each of these documents is incorporated herein, in its entirety, by this reference.

Source-Sets and Source Regions

Frequently, the collection of photo-realistic images used to construct a 3D model includes panoramic photo-realistic images taken from a variety of locations. For example, to create a 3D model of a house, panoramic photo-realistic images may be captured at many different capture points within each room of the house. Consequently, any given portion of the model (e.g. wall, door, or table) may correspond to a real-world feature that is depicted in multiple photo-realistic images within the collection.

The set of photo-realistic images that depict the real-world feature that corresponds to a given portion of a 3D model is referred to herein as the "source-set" for that given portion of the 3D model. For example, assume that a 3D model of a house:

was constructed from 100 photo-realistic images has a five doors has a five rooms Assume that one of the five doors is depicted (from different viewpoints) in 3 of the 100 photo-realistic images. Those 3 photo-realistic images qualify as the source-set for the portion of the model that represents that door. Similarly, if 20 of those photo-realistic images depict different views of a particular room, then those 20 photo-realistic images are the source-set for the portion of the 3D model that represents that particular room.

The term "source-region" refers to the region, within each image in the source-set, that corresponds to a particular portion of the 3D model. For example, a portion of a 3D model of a house may represent a room X. For photo-realistic images that depict only room X, the source-region is the entire photo-realistic image. On the other hand, for photo-realistic images that depict part of room X and part of other rooms, only the region that depicts room X qualifies as the source-region for room X.

Aggregating Source-Region Classifications to Improve Classification of a Target Region Referring to FIG. 1, it is a flowchart that illustrates how the classification of a target region of a photo-realistic image may be improved based on the source set of the portion of a 3D model that corresponds to the photo-realistic image. Referring to FIG. 1, at step 100 a 3D model is constructed based on a collection of photo-realistic images. As explained above, any number of techniques may be used to generate the 3D model, and the techniques described herein are not limited to any particular model construction technique.

At step 102, each photo-realistic image in the collection of photo-realistic images used to construct the 3D model is automatically classified using a trained machine learning engine. For the purpose of illustration, it shall be assumed that the photo-realistic images are of a real-world house, the 3D model is a model of the real-world house, and the photo-realistic images are automatically classified to indicate (a) objects within the house (e.g. door, windows, furniture) and (b) the room-type of the room depicted in the image. With respect to room-type classification, the room-type classification may take the form of confidence scores assigned to each room-type. For example, a particular photo-realistic image A may be classified as having 60% probability of being a kitchen, 30% probability of being a bedroom, 5% probability of being a bathroom, 5% probability of being a dining room.

As mentioned above, the accuracy of such automated classifications is often less than would be achieved by manual classification. Steps 104 to 112 may be performed for one or more target regions of one or more of the photo-realistic images in the collection to improve the accuracy of classifications of those target regions. For the purpose of explanation, steps 104 to 112 describe classification adjustment where one target region of a photo is adjusted at a time. However, to improve efficiency, embodiments may adjust many images in a batch. When performed in a batch, the amalgamation of the individual image classifications may be used to determine the classification of a particular portion of the 3D model. Then, those classifications are back-projected to the individual images.

When classification adjustment is performed on a per-target-region basis, at step 104, a target region of a target photo-realistic image is selected for classification adjustment. For the purpose of illustration, it shall be assumed that the target region selected in step 104 is the entirety of a photo-realistic image A, and that the classification to be adjusted is the room-type classification (which is initially 60% kitchen, 30% bedroom, 5% bathroom, 5% dining room).

At step 106, the portion of the 3D model that maps to the target region is determined. The portion of the 3D model to which the target region maps is referred to herein as the "target portion" of the 3D model. The portion of the 3D model to which a given target region maps may be determined based on spatial location and orientation information associated with the target region, and spatial location and orientation information associated with the 3D model.

The granularity of the target portion of the model is dictated, in part, by the nature of the classification that is being adjusted. In the present example, since the classification at issue is a room-type classification, the target portion of the 3D model may be the room, within the model, to which the target photo-realistic image maps. Thus, in this example, the target portion of the model encompasses more than merely what is shown in the target region. Alternatively, for a room-type classification, classifications may be separately assigned to each mesh face in the room (e.g. each mesh face of the portion of the 3D model that represents the room), rather than to the entire room. When room-type classifications are made at the per-face level of granularity, the target portion of the model may be a single face, or each face depicted in the target photo-realistic image may be separately processed as the "target portion".

At step 108, the "source-set" for the target portion of the 3D model is determined. The source-set for the target portion of the 3D model is the set of photo-realistic images that depict the real-world content that is represented by the target portion of the 3D model. In the present example, the target portion of the 3D model is the room, within the 3D model, that represents the room depicted in photo-realistic image A. That room shall be referred to herein as "room X".

For the purpose of explanation, it shall be assumed that the source-set of room X includes photo-realistic images A to H. Once the source-set of the target portion of the model has been determined at step 108, the source-regions within those source-set images are determined. As mentioned above, the source-regions of a source-set image may include the entire image, or a subset thereof. For the purpose of explanation, it shall be assumed that everything shown in images A to H correspond to room X. Both the source-set and the source-regions are determined based on a comparison of the spatial metadata (e.g. capture location, orientation, and depth data) associated with each of the images of the source set to the spatial metadata associated with the 3D model.

After the source-regions have been determined in step 110, classification of the target region is adjusted based on classifications assigned to the source-regions. Specifically, the classifications assigned to the source regions may be aggregated to produce an aggregate classification. The aggregate classification may be assigned to the target portion of the 3D model. The aggregate classification may then be back-projected to the target region (and, optionally, to regions in other photos that correspond to the target portion of the 3D model). For example, assume that "bedroom" has the highest score in the room-type classifications in majority of images A to H. Under these circumstances, the aggregate room-type classification may be determined to be "bedroom", and the room-type classification for photo-realistic image A may be changed to "bedroom".

The classification adjustment made in step 112 may be more sophisticated than simply adopting the classification made for the majority of source-regions. For example, in the case of room-type classifications, the room-type classification of photo-realistic image A may be changed to be the average of the room-type classifications of all source-regions that depict room X. As another example, the classification confidences from the source-regions may be combined in a more sophisticated manner described in the following section.

Combining Classification Confidences

Classifiers may have built-in biases. For example, a classifier that has been trained to assign "room-type" classifications to views may have a bias towards the "bedroom" label because bedrooms are the most common type of room in most residential homes. In situations where such biases exist, merely taking the arithmetic or geometric mean over the classifications of the source-regions (in this case, the views of the room that is being classified) may magnify the prior bias.

To avoid that outcome, Bayes' formula may be applied as described hereafter. Assume that the initial classifier for each picture Di and room class r indicates a probability of room belonging to that class:

$$p(r|D_i)$$

The goal is to find a combined probability across several different pictures:

$$p(r|D_1 \ldots D_n)$$

According to Bayes:

$$p(r|D_1 \ldots D_n) = \frac{p(D_1 \ldots D_n | r)p(r)}{p(D_1 \ldots D_n)}$$

Assuming that images like D1 and Dn are conditionally independent given r, this can be rewritten:

$$p(r|D_1 \ldots D_n) = \frac{p(D_1 | r) \ldots p(D_n | r)p(r)}{p(D_1 \ldots D_n)}$$

While it is unlikely that images D1 and Dn are entirely conditionally independent given r, making this assumption produces a reasonable approximation. Based in this assumption, Bayes' rule can be applied again to produce:

$$p(r|D_1 \ldots D_n) = \frac{p(D_1) \ldots p(D_n)p(r|D_1) \ldots p(r|D_n)p(r)}{p(r)^n p(D_1 \ldots D_n)}$$

Observing that the sum of all probabilities equals to one:

$$\sum_r p(r|D_1 \ldots D_n) = 1$$

for each r, probability may be computed as:

$$p_r = \frac{p(r|D_1) \ldots p(r|D_n)}{p(r)^{n-1}}$$

This can be normalized to 1:

$$p(r|D_1 \ldots D_n) = \frac{p_r}{\sum_r p_r}$$

As an example, assume that this formula is applied to a situation where there are 10 pictures (source-regions) of a room. For each picture, assume that the classifier says that it's a bedroom with 90% probability, but a pool room (billiards) with 10% probability. From prior determinations, it is known that usually 20% of rooms are our bedrooms and only 1% are pool rooms. Applying the formula to that situation, the combined confidence would be that there is a 99.3% probability that the room in question (the target portion of the 3D model) is a pool room.

In one embodiment, this classification aggregation formula is enhanced by weighting the classification probabilities from source regions' classifications based on distance from camera center to mesh face, and angle between face normal and vector from camera center to face centroid. Thus, a face seen in the photo-realistic image that is far away and at a sharp angle will get less weight in the aggregated classification than a face that is closer and facing the camera. It should be noted that in aggregating classifications, such weight adjustments are optional, and the factors used to adjust weights may vary based on the nature of the item being classified. Other such factors include, but are not limited to, the percentage of the room/object that appears in the image, how close a view the image has of the room/object, etc.

Fine Granularity Example

Steps 104 to 112 may be repeated for any number of target regions of any number of target photo-realistic images. As mentioned above, the target region selected in step 104 may be as large as an entire panoramic photo-realistic image, or as small as a pixel. As another example of the technique illustrated in FIG. 1, assume that that target region selected in step 104 is a set of pixels, within photo-realistic image A, that depict an object X. Further assume that, within photo-realistic image A, object X has been classified as a table.

At step 106, the portion of the 3D model that maps to the target region is determined. In the present example, since the classification at issue is object-specific classification, the target portion of the 3D model is the object, within the model, that represents object X. Determining the portion of the 3D model that maps to the target region may be complex. For example, assume that the target region depicts a portion of a table. A table has many sides, and the portion of the table that is depicted in the target region may only be a fraction of the table. Different images will see different parts of the same table. Thus, according to one embodiment, a model-centric segmentation is performed to separate the table from other portions of the model. After performing a model-centric segmentation, step 106 may be performed based, in part, on the model-centric segmentation.

At step 108, the "source-set" for the target portion of the 3D model is determined. In the present example, the target portion of the 3D model is the representation of object X. For the purpose of explanation, it shall be assumed that the source-set of object X includes photo-realistic images A, B and C. Once the source-set of the target portion of the model has been determined at step 108, the "source-regions" within the source-set photo-realistic images are identified. In the present example, it is determined which pixels, within photo-realistic images A, B, and C, depict object X.

After the source-regions have been determined in step 110, classification of the target region is adjusted based on classifications of assigned to the source-regions. As mentioned above, adjusting the classification of the target region may involve generating an aggregate classification using simple or complex aggregation techniques. As a simple aggregation example where "majority rules", if the source-regions of photo-realistic images B and C has been classified as depicting "couch", then the classification of the target region in photo-realistic image A may be changed from "table" to "couch".

It should be noted that a classifier that outputs a category could be run just on each source region, or a per-pixel classifier could be run on the whole image containing the source region. In the latter case, the classification for any given source region could be an amalgamation of the classifications of the pixels in the region.

Variations

The steps illustrated in FIG. 1 are merely an example of how one embodiment may adjust classifications. Other embodiments may modify the sequence of steps to arrive at similar results. For example, rather than automatically classify all photo-realistic images in step 102, the automatic classification may be performed only on the target photo-realistic image (after step 104), and on the source-set of the target portion of the 3D model (after step 110).

As another example, when the classification of a feature is adjusted on the target photo-realistic image, the classification of the same feature may undergo the same adjustment on all other photo-realistic images in the source-set of that feature. For example, assume that the same object has been classified as a window in three photo-realistic images, as a door in one photo-realistic image, and as a painting in five photo-realistic images. Under these circumstances, step 112 may involve adjusting the classification of the object in all nine photo-realistic images to indicate that the object is a painting.

The classification step may also include a classification step based directly on the 3D model itself. Machine learning algorithms or other algorithms may make a classification judgement based on the 3D model's geometry, its appearance, the square footage of a room, the shape of a room, or other properties. Individual images' classifications may serve as inputs to this 3D model-based classifier. One example of a 3D model-based classifier that runs on voxels: stanford.edu/~rezab/papers/fusionnet.pdf.

Automated Labeling of 3D Model Segments

Once a 3D model has been segmented (either manually or by using an automated segmentation technique), it is often useful to tag each segment with appropriate metadata. For example, in the case of a 3D model of a house that has been segmented into rooms, it is often desirable to tag the rooms with metadata that indicates the appropriate room-type (kitchen, bathroom, dining room, etc.). An example of how 3D model segmentation may be performed shall now be given with reference to FIGS. 2-4.

Figure 2:
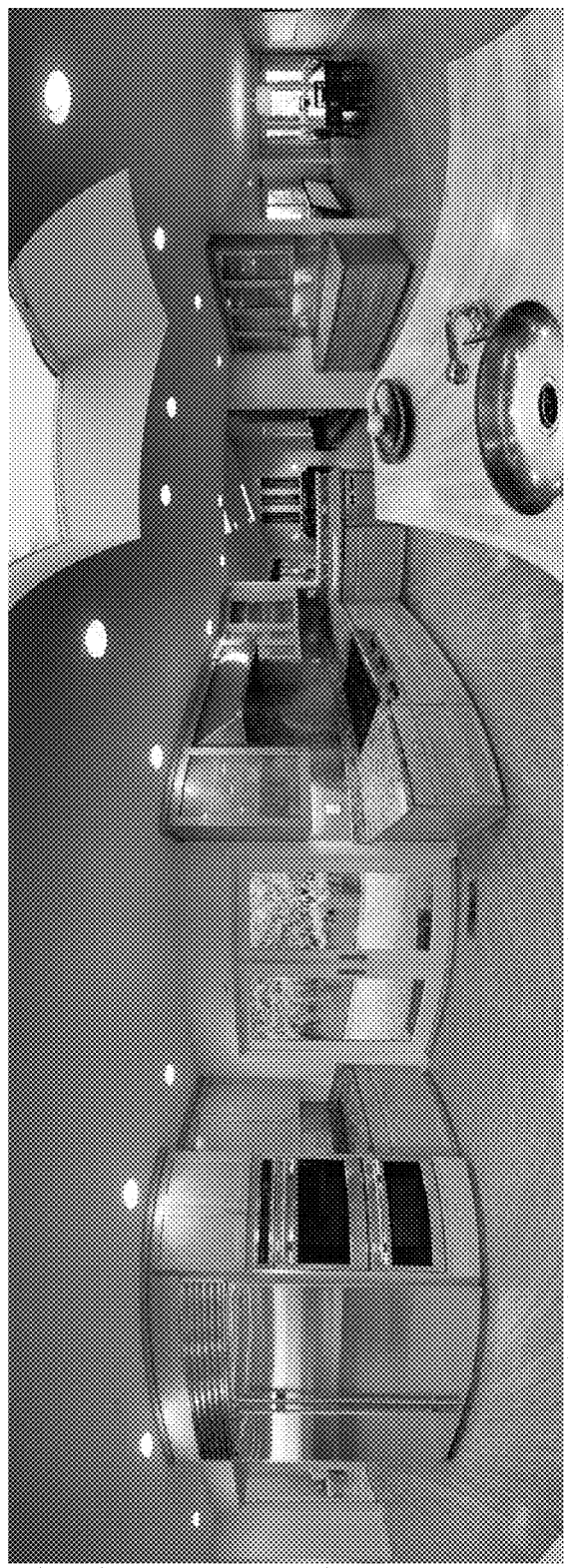
FIG. 2 illustrates a panoramic photo-realistic image that may be used, in combination with associated depth/distance metadata, to create a 3D model of a real-world space.

As mentioned above, a 3D model of a real-world space may be constructed based on panorama images of known locations/poses throughout the space. FIG. 2 is an example of a panoramic view of the interior of a house. For the purpose of explanation, it shall be assumed that the panoramic view illustrated in FIG. 2 is one photo-realistic image of a collection of photo-realistic images that is used to construct a 3D model of "house X".

Figure 3:
FIG. 3 illustrates six views, each of which contain an overlapping region of a 3D model.
Figure 3:
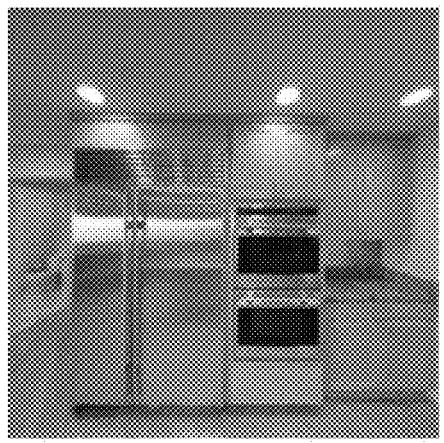
Figure 3:
Figure 3:
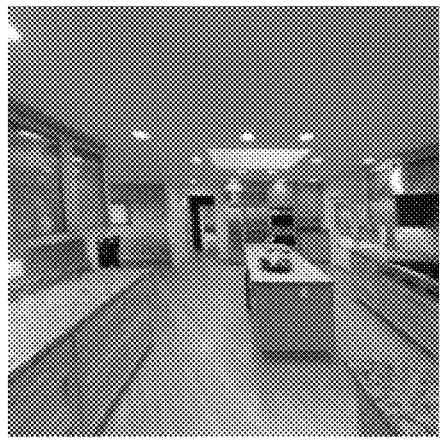
Figure 3:
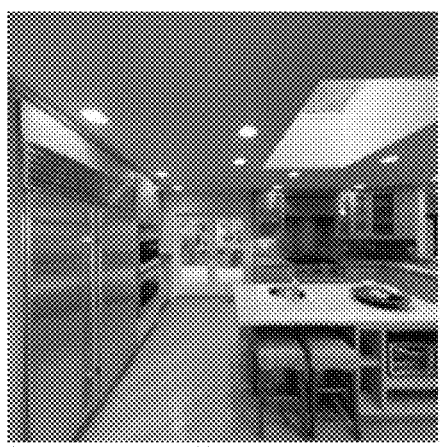
Figure 3:
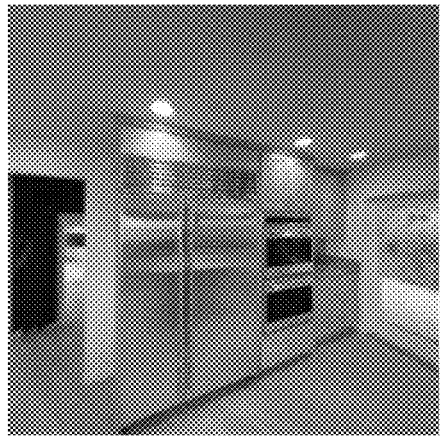

As part of the construction of the 3D model, a mesh for the space may also be created. With a virtual camera, views can be generated from any panorama for any field of view, roll and yaw and almost any pitch. Since the panorama images have known locations/poses, it is possible to automatically determine that a plurality of views are looking at the same part of the mesh. FIG. 3 illustrates six views from different panoramas of the same part of the mesh of house X.

According to an embodiment, the system back-projects from each view to the mesh and finds, at some granularity (e.g. on a mesh-face by mesh-face basis), which part of the mesh is visible for the view. The process of finding the part of the mesh that is visible for the view is an example of step 106, where the "target region" is the view in question.

In the present example, the goal is to apply accurate labelling to portions of the 3D model itself. Therefore, once the view-to-face mapping is determined for the various views of the house, the system assigns room labels to each face in the mesh based on the classification of the different views that map to the face. For example, the room-type classifications that have already been assigned to the views in FIG. 3 are assigned to the faces of the room, within the 3D model, that are depicted in those views.

Figure 4:
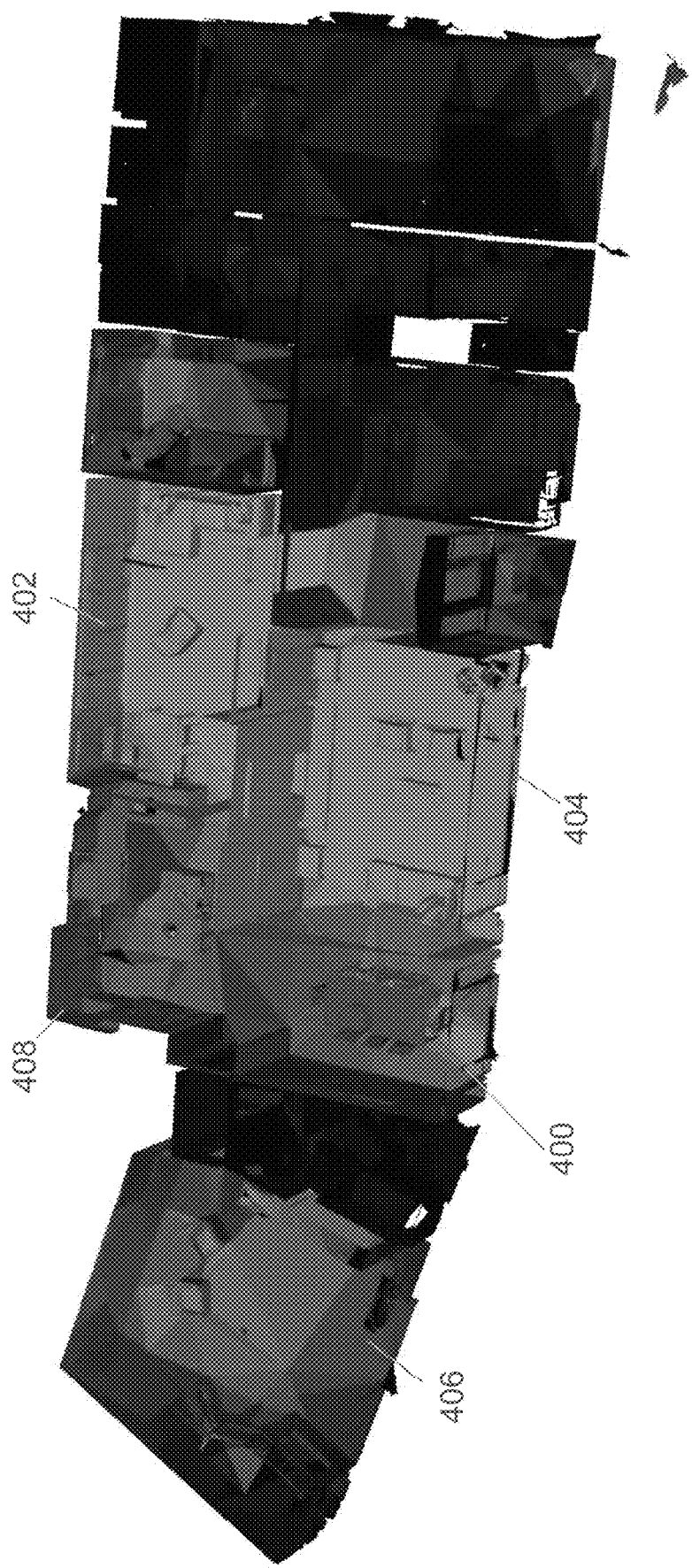
FIG. 4 illustrates a 3D model onto which view-classifications have been projected, according to an embodiment, where different classifications are represented by different colors.

FIG. 4 illustrates the mesh of house X after the room-type classifications of views have been projected onto the corresponding faces of the mesh. For the purpose of illustration, the room-type classifications assigned to each face in the mesh is illustrated by the coloring of the face of the mesh, where the degree to which a face reflects a particular color indicates the degree to which the face has been classified as the room-type to which that color is assigned. In the illustrated example, blue is assigned to "dining room" and the faces of room 400 are predominantly blue, indicating that the views that map to room 400 of the 3D model were predominantly classified as "dining room".

Similarly, green has been assigned to "living room" and the faces of rooms 402, 404 and 406 are predominantly green, indicating that the views that map to those rooms were predominantly classified as "living room". Red has been assigned to "kitchen" and the faces of room 408 are predominantly red, indicating that the views that map to room 408 were predominantly classified as "kitchen".

Using multiple views/classifications per mesh face increases accuracy of the classification of the mesh face. For example, one or more views of room 408 may have been labeled "dining room". However, because all views of room 408 were taken into account when projecting labels onto the faces of room 408, room 408 (and the mesh faces thereof) are more accurately labeled "kitchen".

Face-To-View Projection

Once faces in the mesh have been classified from multiple views, the system can project from faces in the mesh back to views and get a per-view classification that has higher accuracy compared to the classification of the original view. This process is equivalent to step 112 of FIG. 1, since the classifications that have been assigned to each mesh face are an aggregation of the classifications of the "source regions" of the mesh face.

Figure 5:
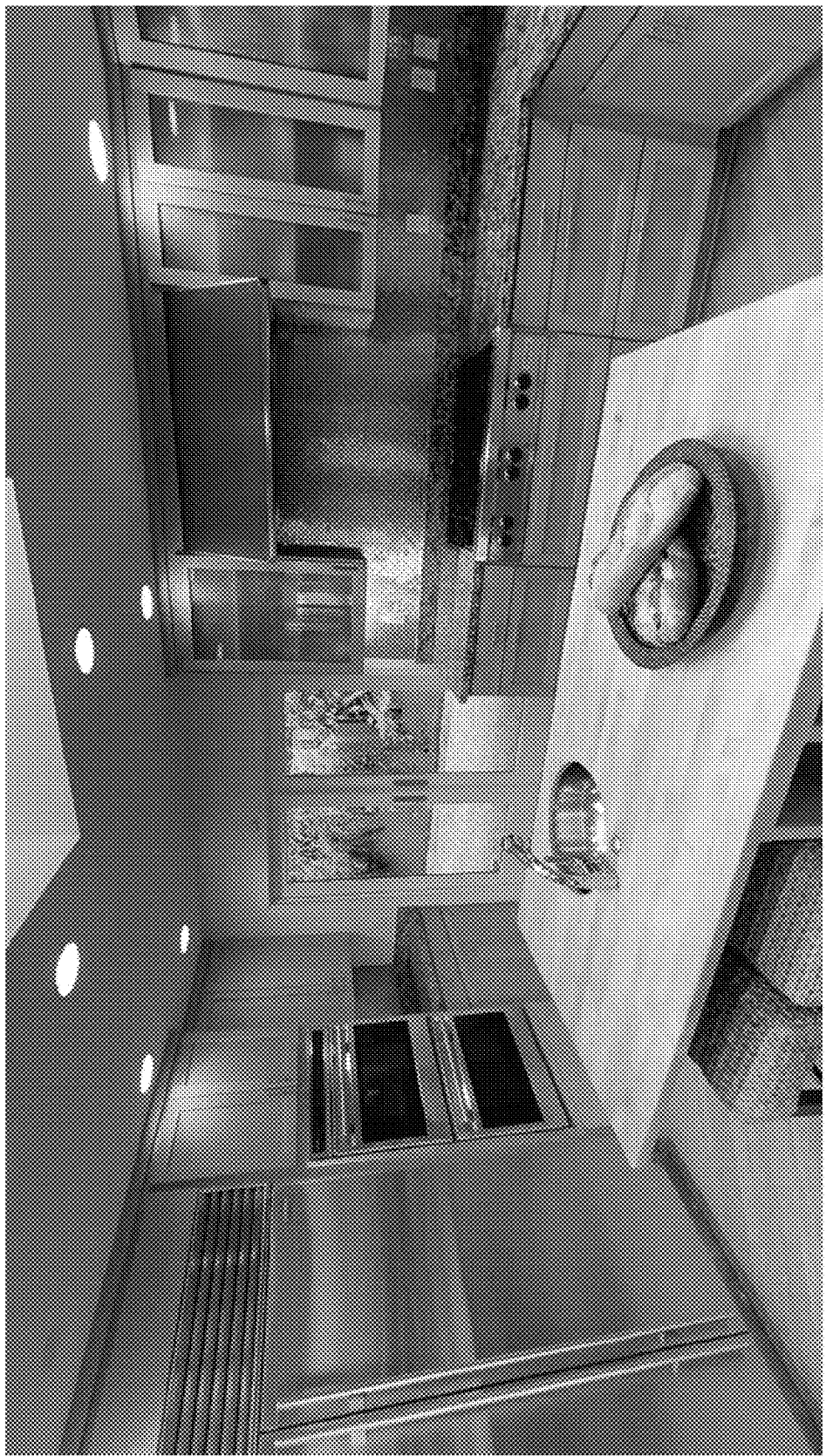
FIG. 5 illustrates a view (target region) whose classifications have been adjusted/improved using the technique illustrated in FIG. 1.

FIG. 5 is a view that was initially classified as depicting a "kitchen" with a classifier confidence of 87%. However, after adjusting the room-type classification of view based on the classifications that were assigned to the mesh faces that map to the view (which are mesh faces of in room 408 of FIG. 4), the room-type classification of the view is adjusted to be "kitchen" with a 99.4% classifier confidence.

Improved Segmentation of 3D Models

Improving the accuracy of target region/view classifications is merely one of many benefits for assigning classifications to portions of a 3D model using the techniques described herein. Another use is to improve the segmentation of the 3D model itself. Specifically, various techniques can be used to segment 3D models, including but not limited to computational geometry based approaches. Such techniques may be used, for example, to divide the 3D model of house X, illustrated in FIG. 4, into rooms.

However, such segmentation may be improved by using the classifications assigned to portions of the 3D model as a factor in deciding how to segment the 3D model. For example, prior to projecting room-type classifications to the faces of house X illustrated in FIG. 4, the space containing rooms 400 and 404 may have been treated as a single room. However, after the room-type classifications have been projected to the faces of house X, it is clear that the space in question is more accurately treated as two rooms, one whose faces were predominantly classified at dining room (room 400), and one whose faces were predominantly classified as living room (room 404). Thus, the face classifications may be used in conjunction with any other segmentation technique to improve the accuracy of the segmentation.

Determining "Best Views" of a Real-World Space

It is often desirable to identify which photo-realistic images, from a large collection, represent the "best views" of a real-world space, as defined by a user's experience of aesthetic value, informativeness, or other characteristics. For example, when advertising a house for sale, few potential buyers are willing to wade through a collection of 1000 photo-realistic images of the house. It is much preferable to present to potential buyers one or two of the best photo-realistic images of each room of the house. The actual number to present may vary based on the type of the room. For example, it is often desirable to have more photo-realistic images of the kitchen and fewer photo-realistic images of a walk-in closet.

A collection of images of a building may be created by taking equally-angularly-spaced snapshots from every panographic image that was used to create a 3D model of the building. Various techniques are available for automatically determining the "best views" from such a collection of views. For example, numerous computer vision techniques have been used to determine what constitutes a good view. Such techniques typically take into account visual heuristics, such as image and depth characteristics. By way of example, but not limitation, computer vision techniques for determining what constitutes a good view include any combination of:

1—Casting rays and find the length of the rays (directly from camera depth data or from synthetic depth data from mesh) to calculate the view volume. Greater volume is better.
2—Calculating the variance of the lengths of neighbor rays. Greater variance is better.
3—Calculating mesh normal variance (similar to 2). Greater variance is better.
4—Calculating the variance of the colors of neighbor pixels. Greater variance is better. This can be done by blurring image A to get image B. Subtract image A from image B to get image C. Find the sum of the absolute values of image C.
5—The output of a machine learning algorithm trained to recognize desirable (e.g. aesthetically pleasing) views based on a corpus of training examples.

It should be noted that using either 1, 2, 3 or 4 alone prevents selection of an image of a flat, solid colored wall viewed from a short distance.

According to one embodiment, the techniques described herein may be used in conjunction with existing "best view" selection techniques in a variety of ways. For example, after adjusting the room-type classifications of views using the techniques described herein, those improved room-type classifications may be used as a factor in determining photo-realistic image quality, where the higher the confidence of the room-type classification the higher the quality score. Specifically, if the best "kitchen" photo-realistic image is being selected, then the views with higher confidence scores of being a kitchen probably contain more of the things that make a room a kitchen (e.g. stove, oven, etc.). Therefore, rooms with higher confidence scores (as adjusted using the techniques described herein) for the room-type in question are considered to be better than photo-realistic images with lower confidence scores for that type of room.

Classifications that have been adjusted/improved using the techniques described herein may also be used to determine which photo-realistic images each photo-realistic image is compared against (e.g. the quality scores of "kitchen" photo-realistic images are compared against the quality scores of other "kitchen" photo-realistic images when determining the "best photo-realistic images" for the kitchen).

Those same classifications may be used in selecting a caption to display in conjunction with an image. For example, a photo-realistic image with an adjusted confidence score of 98% for the label "kitchen" may be assigned the caption "kitchen" to be displayed in conjunction with the photo-realistic image itself.

Quality measures that are based on classifications that have been improved using the techniques described herein may also serve as the basis for selecting which photos/views to include in a virtual tour of the house. For example, a virtual tour of a house is typically a video or sequence of images that "walks" the viewer through the house. As the tour visits each room, it is desirable that the tour move to a position to display the "best" view(s) of the room. Consequently, classifications that have been adjusted using the techniques described herein may be used to (a) determine the segmentation between rooms, (b) the type of room associated with each image, and (c) which points of view or photos qualify as "best" for each given room.

Synthetic Viewpoints

In the examples given above, the photo-realistic images that are classified and whose classifications are projected onto the corresponding portions of the 3D model are the photo-realistic images of the real-world space represented by the 3D model. However, once the 3D model is created based on such real-world photo-realistic images, it is possible to render synthetic viewpoints based on the 3D model. Such synthetic viewpoints may be classified in the same manner as the real-world photo-realistic images. Specifically, those synthetic viewpoints may be fed to a machine learning engine that has been trained to classify photo-realistic images (e.g. assign room-type probabilities to the photo-realistic images). Once the synthetic viewpoints have been classified in this manner, the classifications of the synthetic viewpoints may be projected onto the 3D model in the manner discussed above. Those projected classifications may be combined in the same manner as described above, and may be used to improve segmentation of the model and/or the classifications assigned to the synthetic viewpoints.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
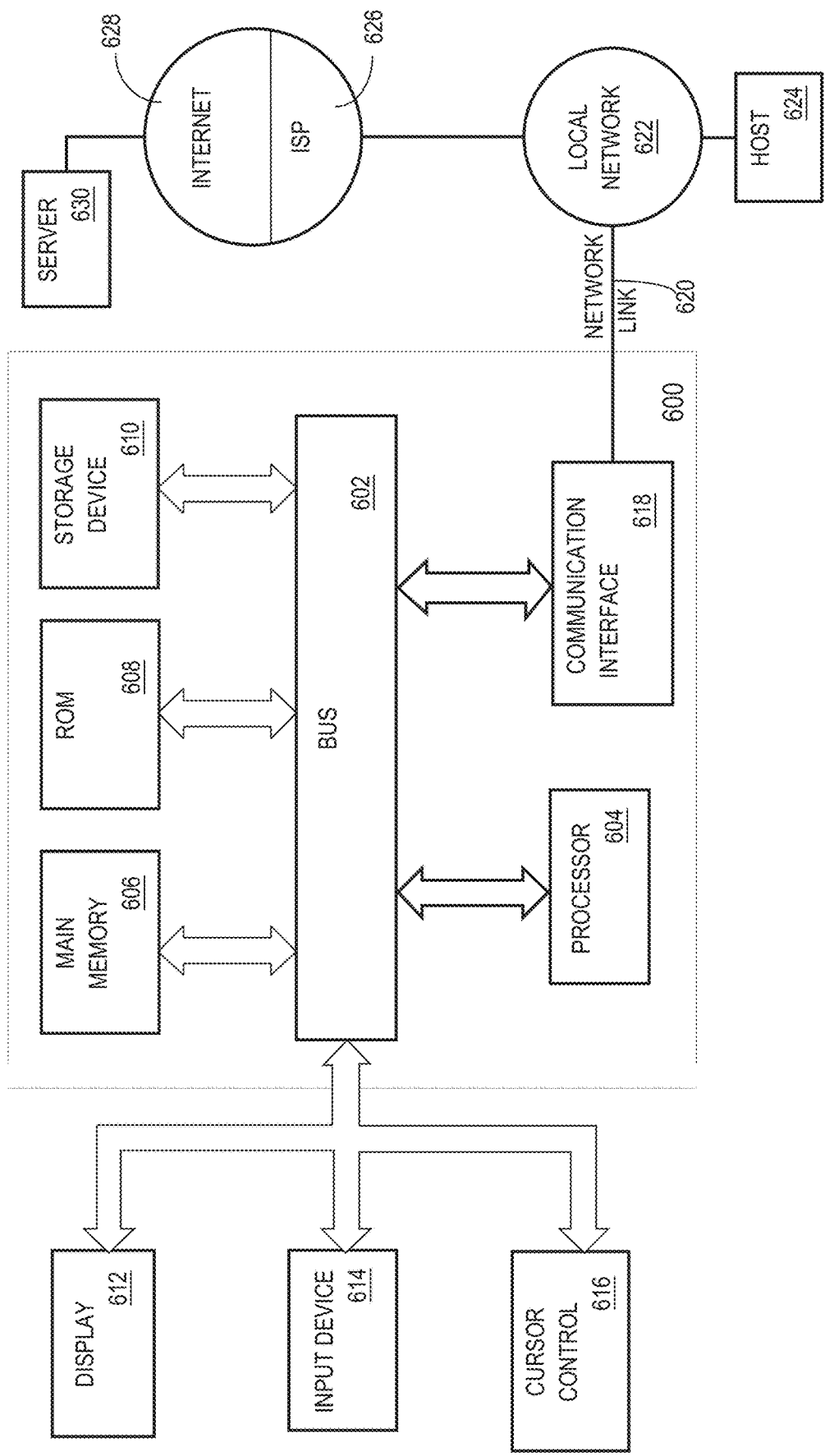
FIG. 6 is a block diagram of a computer system programmed to perform the classification adjustment techniques described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    determining a target portion of a 3D-model, the 3D-model being previously generated based on a collection of digital images;
    identifying a plurality of source-regions in the collection of digital images, each of the plurality of source-regions corresponding to the target portion of the 3D-model;
    assigning a source-region classification to each of the plurality of source-regions in the collection of digital images; and
    assigning a particular classification to a target region of a target digital image based, at least in part, on the assigned source-region classifications for each of the plurality of source-regions in the collection of digital images.

2. The method of claim 1, further comprising: determining the target region in the collection of digital images.

3. The method of claim 2, wherein the target portion corresponding to a portion of the 3D-model that the target region maps to.

4. The method of claim 1, wherein the identifying the plurality of source-regions in the collection of digital images is based on spatial metadata of the collection of digital images.

5. The method of claim 4, wherein the spatial metadata includes capture location orientation data and depth data of the collection of digital images.

6. The method of claim 1, wherein the 3D-model is a 3D-model of a building and the target portion of the 3D-model represents a particular room in the building.

7. The method of claim 6, wherein the particular classification assigned to the target region is a room-type classification.

8. The method of claim 1, wherein assigning the particular classification to the target region comprises:
    aggregating the classifications assigned to the plurality of source-regions to generate an aggregate classification;
    assigning the aggregate classification to the target portion of the 3D-model; and
    determining the particular classification based, at least in part, on the aggregate classification.

9. The method of claim 1, wherein at least one source-region of the plurality of source-regions is a set of pixels within a digital image from the collection of digital images.

10. The method of claim 1, further comprising, providing, to one or more computing devices, a confidence score associated with the target region classification.

11. The method of claim 10, wherein the confidence score is calculated based on an aggregate confidence scores of the plurality of source-regions corresponding to the target portion of the 3D-model.

12. The method of claim 11, wherein the aggregate of confidence scores is a weighted average of the plurality of source-regions corresponding to the target portion of the 3D-model.

13. One or more non-transitory computer-readable media storing instructions which, when executed by one or more computing devices, cause the one or more computing devices to perform:
    determining a target portion of a 3D-model, the 3D-model being previously generated based on a collection of digital images;

identifying a plurality of source-regions in the collection of digital images, each of the plurality of source-regions corresponding to the target portion of the 3D-model;

assigning a source-region classification to each of the plurality of source-regions in the collection of digital images; and assigning a particular classification to a target region of a target digital image based, at least in part, on the assigned source-region classifications for each of the plurality of source-regions in the collection of digital images.

14. The one or more non-transitory computer-readable media of claim 13, wherein the instructions, when executed by one or more computing devices, further cause, determining the target region in the collection of digital images.

15. The one or more non-transitory computer-readable media of claim 13, wherein the target portion corresponding to a portion of the 3D-model that the target region maps to.

16. The one or more non-transitory computer-readable media of claim 13, wherein the identifying the plurality of source-regions in the collection of digital images is based on spatial metadata of the collection of digital images.

17. The one or more non-transitory computer-readable media of claim 16, wherein the spatial metadata includes capture location orientation data and depth data of the collection of digital images.

18. The one or more non-transitory computer-readable media of claim 13, wherein the 3D-model is a 3D-model of a building and the target portion of the 3D-model represents a particular room in the building.

19. The one or more non-transitory computer-readable media of claim 18, wherein the particular classification assigned to the target region is a room-type classification.

20. The one or more non-transitory computer-readable media of claim 13, wherein assigning the particular classification to the target region comprises:

aggregating the classifications assigned to the plurality of source-regions to generate an aggregate classification;

assigning the aggregate classification to the target portion of the 3D-model; and determining the particular classification based, at least in part, on the aggregate classification.

21. The one or more non-transitory computer-readable media of claim 13, wherein at least one source-region of the plurality of source-regions is a set of pixels within a digital image from the collection of digital images.

22. The one or more non-transitory computer-readable media of claim 13, wherein the instructions, when executed by one or more computing devices, further cause, providing, to one or more computing devices, a confidence score associated with the target region classification.

23. The one or more non-transitory computer-readable media of claim 22, wherein the confidence score is calculated based on an aggregate confidence scores of the plurality of source-regions corresponding to the target portion of the 3D-model.

24. The one or more non-transitory computer-readable media of claim 23, wherein the aggregate of confidence scores is a weighted average of the plurality of source-regions corresponding to the target portion of the 3D-model.

* * * * *